United States Patent [19]

Dunn et al.

[11] 3,993,425

[45] Nov. 23, 1976

[54] APPARATUS FOR FORMING DIAGONALLY CORRUGATED PAPERBOARD

[75] Inventors: Richard G. Dunn, Greensboro, N.C.; Melvin H. Sidebotham, Jr.; Gordon L. Sidebotham, both of Winchester, Mass.

[73] Assignee: The Real-Reel Corporation, East Providence, R.I.

[22] Filed: Mar. 20, 1975

[21] Appl. No.: 560,186

[52] U.S. Cl. .................................... 425/370; 425/396; 93/1 R

[51] Int. Cl.$^2$ ....................... B29C 15/00; B31D 1/00

[58] Field of Search ................ 93/1 H, 60; 156/205, 156/206, 459, 462; 425/396, 369, 370

[56] References Cited

UNITED STATES PATENTS

| | | | |
|---|---|---|---|
| 2,785,717 | 3/1957 | Knowles | 156/205 X |
| 3,226,458 | 12/1965 | Graff et al. | 156/205 X |
| 3,682,747 | 8/1972 | Munters | 156/205 X |

*Primary Examiner*—Leon Gilden
*Attorney, Agent, or Firm*—Barlow & Barlow

[57] ABSTRACT

Apparatus for forming diagonally corrugated paperboard having a longitudinally elongated frame upon which is laterally mounted at least one corrugating unit. Each corrugating unit consists of a conveyor mechanism having a continuous loop belt with parallel grooves formed in its outer surface and a mechanism to force the web of paper being passed through the corrugating unit down into the grooves of the continuous loop belt. The parallel grooves in the outer surface of the continuous loop belt are oriented diagonally with respect to the direction of travel of the conveyor mechanism. The mechanism to force the web of paper down into the grooves of the belt comprises a plurality of rods that extend in a corresponding diagonal direction across the width of the belt and whose opposite ends are not secured to any structure but which are floatingly carried around a closed loop path structure. The mechanism to force the web of paper down into the grooves further comprises a pair of mounting plates positioned on opposite lateral sides of the continuous loop belt with one of the plates positioned forwardly of the other along the longitudinal axis of said loop belt. Each set of plates rotatably support three gear-like members along their inner faces and these gear-like members synchronously carry the rods in a closed loop path while the ends of the rods are being floatingly carried. This closed loop path is defined by retaining members that pass around a major portion of the path and a vertically oriented plate having cam surfaces along its top and bottom surfaces with these cam surfaces forming a portion of the inner guide surface of said closed loop path. The mounting plates are attached to the frame in such a manner that they may be raised and lowered to thus vary the depth of the corrugations formed in the web of paper passing through the corrugating unit.

10 Claims, 4 Drawing Figures

APPARATUS FOR FORMING DIAGONALLY CORRUGATED PAPERBOARD

BACKGROUND OF THE INVENTION

This invention relates generally to machines utilized in corrugating paperboard and more specifically to a machine utilized in making cloth-board reels, such as used for carrying cloth wound thereabout. In the past, cloth has been wound on reels fabricated of wood. These heavy and sturdy wooden reels were necessary to withstand the torsional and buckling stresses imparted during machine winding of cloth on the reels. Due to the weight of these reels and their expense, cloth-board reels made of paper stock have been developed but these products have not been entirely satisfactory. The major shortcoming of the cloth-board reels made from paper stock has been that they have not proven reliably staunch and sturdy under all conditions of use. This shortcoming has been overcome by making these paper stock cloth-board reels from paper that has been diagonally corrugated. This allows the cloth-board reels to resist torsional and buckling stresses both applied during machine winding of the cloth on the reels and also the stresses applied on the reels when they are being handled or displayed by the ultimate consumers.

SUMMARY OF THE INVENTION

This invention is directed to a machine for manufacturing cloth-board reels fabricated from paper stock in which one or more of the layers of paper stock are diagonally corrugated. When more than one corrugating unit is used, the operation of each is identical except that the orientation of certain components in the corrugating units would be reversed so that the diagonal corrugations formed by the alternating units would be oriented oppositely oblique to the path of travel of the web of paper through the apparatus. Each corrugating unit has a conveyor mechanism with a continuous loop belt passing therearound having parallel grooves formed in its outer surface oblique to the direction of travel of the belt. The continuous loop belt is comprised of a plurality of elongated sections secured laterally to each other with the inner surfaces of the elongated sections secured to the outer surface of a continuous loop chain. The flat surface of the webbing of the paper roll which is to be corrugated is threaded over the top surface of the continuous loop belt and beneath the corrugating mechanism that forces the web of deformable paper material down into the grooves of the belt as the paper passes through the apparatus. This mechanism for forcing the paper downwardly is comprised of a plurality of rods that extend diagonally across the width of the continuous loop belt and whose opposite ends are not secured to any structure. These rods are floatingly carried by gear-like members around a closed loop path above the paper and the rods are forced downwardly into the grooves in the continuous loop belt by cam surfaces to form corrugations in the paper extending diagonally thereacross. There are a predetermined number of rods enclosed in the closed loop and predetermined spacing is maintained between them so that a rod is pressed down into each groove of the continuous loop belt as the web of paper starts through the corrugating unit. As each rod completes its corrugating operation on the web of paper it is lifted upwardly by a rearwardly positioned gear-like member and carried rearwardly around the closed loop while maintaining the predetermined spacing between the individual rods so that the movement is fully synchronized.

DESCRIPTION OF THE PREFERRED EMBODIMENT

Figure 1:
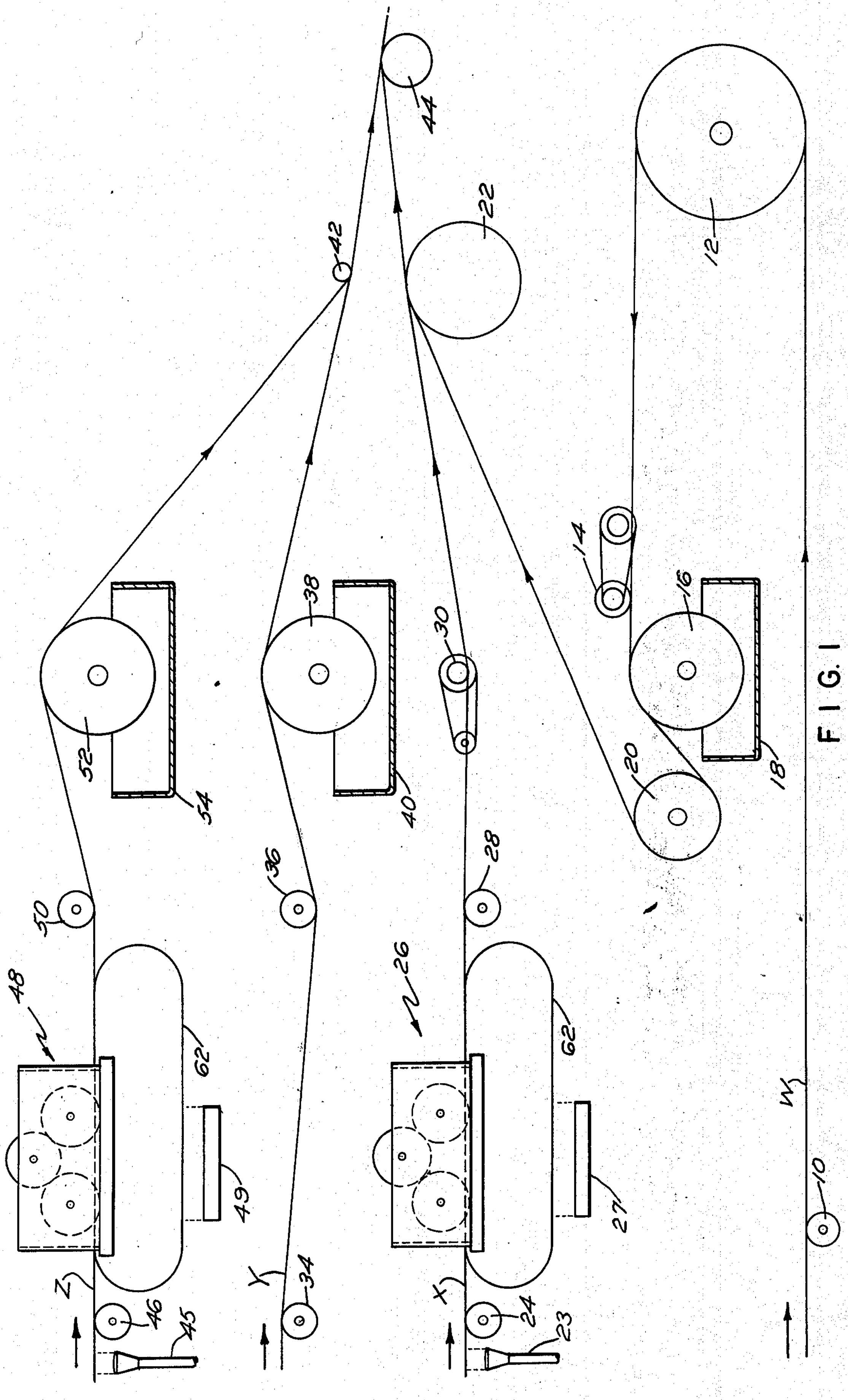
FIG. 1 is a schematic elevation view illustrating the operations performed by the machine.

Referring to FIG. 1 the operation of the novel paperboard corrugating apparatus will be described. For the purpose of this discussion it will be assumed that four plain sheets of paperboard webbing are to be passed through the machine with various operations being performed on each sheet before they are combined together into a single sheet form. The use of four sheets of paperboard is used to produce clothboard reels having a five layer construction. If it is desired to form clothboard reels having a three-layer construction only two plain sheets of paperboard webbing are passed through the apparatus.

The plain sheets of paperboard webbing are identified by the letters W, X, Y and Z respectively. Sheet W passes along the bottom of the machine over roll 10 located at the rear of the machine and then travels forward beneath and up around roll 12 located at the forward part of the machine. This reverses the direction of travel of sheet W and it then passes under tension control roll 14 prior to passing over roll 16. Since roll 16 is rotating in glue tray 18, it deposits a coating of glue on plain sheet W as it passes thereover. Next sheet W passes around roll 20 to have its direction reversed a second time so that it again travels forwardly through the machine and over roll 22 where it is combined with sheet X that has just been corrugated prior to their going onto the operation that forms the web into clothboard reels. The width of plain sheet W is a litter more than twice the width of the other rolls of sheet material due to the fact that at a future operation its lateral sides are folded up over the top of all the combined sheets with a slight overlapping taking place before these overlapping portions are pressed together in a sealed relationship.

Plain sheet X passes forwardly over water spray unit 23, roll 24 and then into corrugating unit 26 having a heating box 27. Within this unit diagonal corrugations are formed in plain sheet X after which it passes over roll 28 and beneath tension control roll 30 on its way to roll 22. At this point corrugated sheet X is attached to plain sheet W by the glue which has been deposited on its top surface.

The third plain sheet, which is sheet Y, passes forwardly over roll 34 and then beneath roll 36 before passing over roll 28. Since roll 38 is rotating in glue tray 40 it deposits a coating of glue upon the bottom surface of plain sheet Y as it passes thereover on its way beneath guide bar 42. As plain sheet Y continues forwardly it passes over roll 44 where it is pressed into contact with the top of corrugated sheet X and adhered thereto by the glue deposited on its bottom surface and then the combined sheets are led to a suitable takeup roll driven as required with slip or adjusted revolutions as the roll builds up.

The fourth plain sheet, which is identified by the letter Z, passes forwardly over spray unit 45, roll 46 into corrugating unit 48 having heating unit 49 where diagonal corrugations are formed in the plain sheet but in a direction opposite to that formed in corrugating unit 26. Corrugated sheet Z then passes beneath roll 50 and then over roll 52. The rotation of roll 52 in glue tray 54 causes a coating of glue to be deposited upon the bottom surface of corrugated sheet Z which is then passed beneath guide bar 42 where it is pressed into adhesive contact with the top surface of plain sheet Y. In some cases, it is preferable to eliminate the glue application to sheet Z. To this end, sheet Y will have glue applied to both surfaces thereof.

The operation of one of the corrugating units will next be described by referring to FIGS. 2, 3 and 4. Each of the corrugating units function in the same manner to place diagonal corrugations in the sheets of paper webbing but alternating units reversely orient the direction of the diagonal corrugations. Corrugating unit 26 is basically comprised of conveyor means 60 and the structure which is utilized to force the web of sheet material down into the parallel grooves of closed loop belt 62 to form the corrugations in the sheet paper. The conveyor means is comprised of a pair of sprocket gears 64 and 66 mounted on parallel shafts 65 and 67 respectively, the latter of which is driven by means not shown. Passing around the sprocket gears is a closed loop chain 68 having a plurality of plates 70 mounted on its outer face to which are attached laterally elongated sections 72 (FIG. 4) which in their entirety form a closed loop belt 62. These elongated sections 72 would normally be formed of metal and when in their adjacent relation they have a plurality of parallel grooves 74 across their width formed diagonally to the path of travel of the belt 62. It is into these grooves that the plain sheet webbing is forced to form the corrugations in the sheet material.

Figure 2:
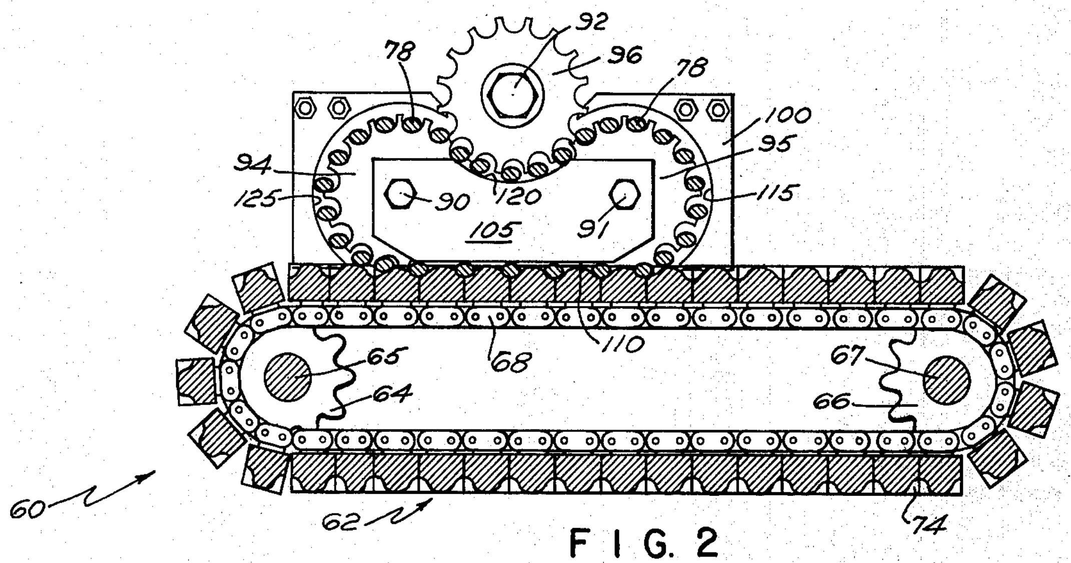
FIG. 2 is a partial elevation view illustrating one of the corrugating units in cross section.
Figure 3:
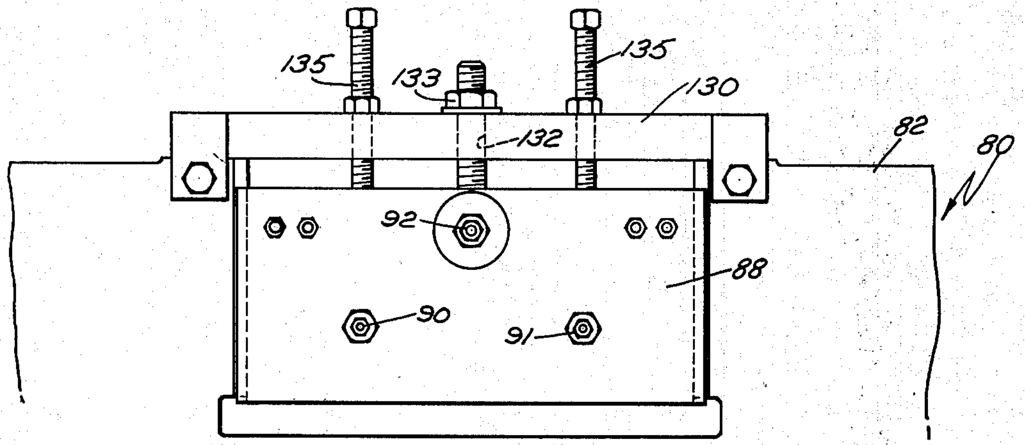
FIG. 3 is a partial elevation view illustrating the vertical adjustability of the corrugating unit.
Figure 4:
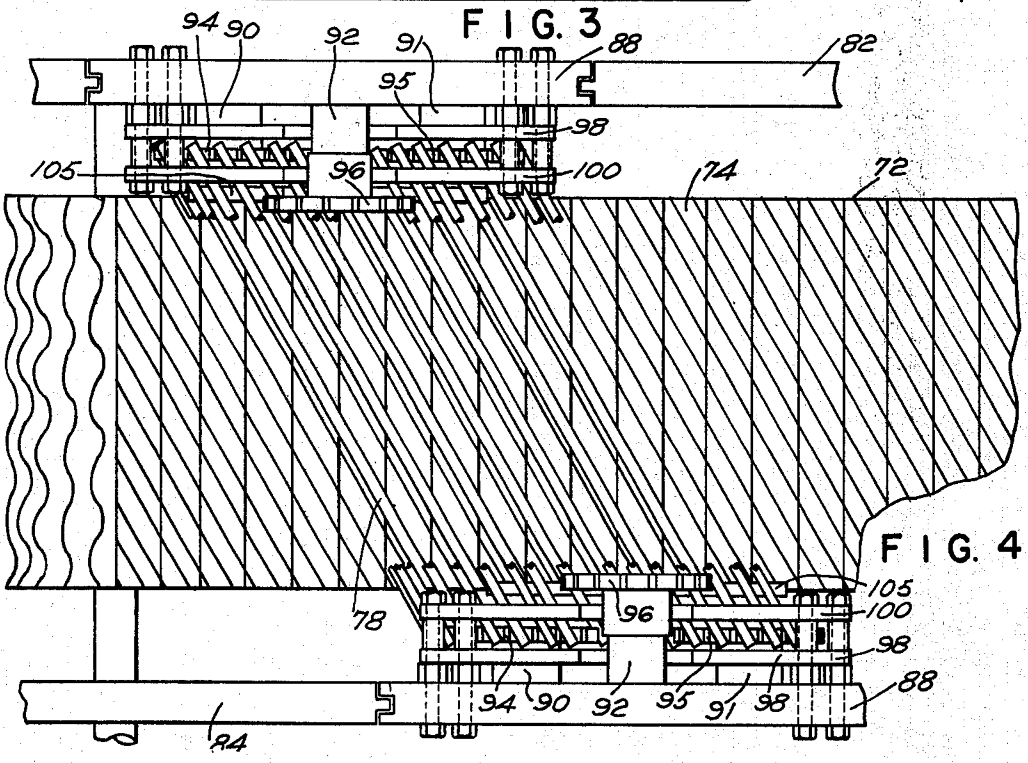
FIG. 4 is a partial top plan view of one of the corrugating units with certain portions broken away for added clarity.

Referring specifically to FIGS. 2 and 4 the structure for forcing the web of sheet material down into grooves 74 will be detailed. A plurality of rods 78 are pushed down into the grooves 74 as the closed loop belt 62 travels forwardly around the sprocket gears. The manner is which the ends of these rods as floatingly carried around a closed loop path means is as follows. Frame 80 of the machine has laterally spaced walls 82 and 84. Each of these walls has a cutout section 86 in which a mounting plate 88 is slidingly positioned by a matting tongue and groove structure on the respective members. One of the cutouts and its plate 88 is advanced with reference to the line of travel of the belt 62 corresponding to the grooves 74 in the belt. Each of these mounting plates support three shafts 90, 91 and 92 that extend into the interior of the machine a short distance and upon which are mounted gear-like members 94, 95 and 96 respectively. Spaced inwardly from each respective mounting plate 88 are solid plates 98 and spaced further inwardly from these plates are retainer plates 100. Plates 98 and 100 are secured to their respective mounting plates 88 by bolts 102. Spaced yet inwardly from retainer plate 100 is cam plate 105 which is mounted on shafts 90, 91.

As seen in FIG. 4, one of these mounting plates 88 is positioned forwardly of the other along the longitudinal axis of the continuous loop belt. In this manner the rods 78 are aligned with the diagonal grooves 74 in the closed loop belt 62. The length of the rods 78 when they are so diagonally positioned is such that they would be longer than the diagonal distance between plates 100 and less than the same diagonal distance between plates 98. Thus the rods are limited in their axial movement. In order to describe how the rods force the plain sheet of paperboard webbing into a corrugated shape the path of one of these rods will now be discussed with the starting point being where rod is initially dropped into groove 74 toward the front area of the conveyor means 60. Since this conveyor means is being continually driven, this rod laying diagonally to the direction of feed of and on top of the paperboard sheet is carried forwardly just resting on top of that paperboard sheet until it contacts cam surfaces 110 on the underside of cam plates 105. These cam surfaces contacting the opposite ends of the rod 78 then force it down into groove 74 with the web of paperboard being pressed beneath it into these grooves. As the rod 78 travels out from beneath cam surface 110 its opposite ends are picked up from the sheet by gear-like members 95 and slidingly carried upwardly along the arcuate surfaces 115 of the retainer plates 100. After the rods have traveled around an arc of approximately 270° they are dropped out of the grooves of gear-like members 95 down onto cam surfaces 120 of cam plates 105. At this point the teeth of gear-like members 96 engage rod 78 transporting it rearwardly along cam surface 120 as the members rotate. At the front end of cam surfaces 120 the teeth of gear-like members 96 disengage from rod 78 and the teeth of gear-like members 94 enter into engagement with rod 78. Rotation of gear-like members 94 in a counterclockwise direction causes the rod 78 to be transported rearwardly through an arc of approximately 180° whereupon the rod 78 falls against arcuate surface 125 of retainer plate 100 and it is then carried downwardly and forwardly by the teeth of gear-like members 94 until the rods reach the position where they are again ready to be forced into the grooves 74 of closed loop belt 62. This would describe the full cycle through which each of the plurality of rods 78 is passed in a position diagonal to their feed with their ends floatingly supported while the conveyor means is carrying the plain sheet of web paperboard forwardly through the machine. The corrugating units are driven from the conveyor means 60 through these rods 78 engaging the gear-like members 94, 95, 96.

Part of the versatility of the novel corrugating unit also lies in the fact that the depth of the corrugations formed in the paperboard webbing can be varied. The manner in which this is accomplished will be readily understood by referring to FIG. 3. There it is shown that the mounting plate 88 is vertically adjustable in cutout sections 86 due to their matting tongue and groove structure. This is accomplished by the bridge member 130 whose opposite ends are fixedly attached to the wall of the frame on opposite sides of the cutout section 86. A stud bolt 131 fixedly secured in mounting plate 88 passes upwardly through bore 132 and has a nut 133 fastened upon its top. By tightening and loosening nut 133 the mounting plate may be adjusted vertically with the resultant effect that cam surface 110 is raised and lowered which controls the depth to which the rod 78 are pressed within the parallel grooves 74 of the closed loop belt. After the mounting plate has been adjusted to its desired height, set screws 135 are tightened down to maintain the mounting plate in a fixed position.

Due to a tendency of the web of paper stock passing through each of the corrugating units to track improperly, the rolls 24 and 46 are adjustably attached to the respective side walls 82 and 84 of the apparatus. Thus the ends of the rolls may be adjusted in the horizontal plane forwardly or rearwardly whereby the roll may be obliquely oriented with respect to the longitudinal axis of the apparatus. In operation the oblique angle of the roll would be reversely oriented to the oblique angle of the diagonal grooves to produce a drag effect on the web of paper stock to keep the web properly tracking through the corrugating unit. The oblique angle of the rolls would be variable as would be necessary to keep it properly tracking. It is also possible to mount tension control rolls 30 and 50 so that their ends are vertically adjustable to thus provide an additional structure that may be utilized to maintain proper tracking of the web of paper passing through the corrugating unit. In operation the end of the tension control roll that is positioned the lowest would produce a drag effect on the web of paper toward that side of apparatus. The angle at which rolls 30 and 50 would be oriented would again be varied as would be necessary.

What is claimed is:

1. Apparatus for producing corrugated sheet from a web of deformable material comprising a frame, at least one corrugating unit mounted on said frame comprising conveyor means having a continuous loop belt with parallel grooves formed in its outer surface, and means to force a web of deformable material down into the grooves of said belt as the web of deformable material is passed through the apparatus, closed loop path means at each side of the conveyor means, said means to force the web of deformable material down into the grooves of said belt comprising a plurality of rods independent of each other that floatingly extend across the width of said continuous loop belt and whose opposite ends are floatingly carried around said closed loop path means during a major portion of their travel and a cam to force said rods into said sheet during a portion only of their travel while performing the corrugating operation.

2. Apparatus for producing corrugated sheet from a web of deformable material as recited in claim 1 wherein said continuous loop belt is comprised of a plurality of elongated sections secured laterally to each other.

3. Apparatus for producing corrugated sheet from a web of deformable material as recited in claim 2 wherein said parallel grooves are oriented diagonally with respect to the direction of travel of the conveyor means.

4. Apparatus for producing corrugated sheet from a web of deformable material as recited in claim 3 wherein the bottom surface of the elongated sections of the continuous loop belt are secured to the outer face of a continuous loop chain.

5. Apparatus for producing corrugated sheet from a web of deformable material as recited in claim 3 wherein said elongated sections are made of metal.

6. Apparatus for producing corrugated sheet from a web of deformable material as recited in claim 1 wherein said means to force the deformable material down into the grooves of said belt further comprises a pair of laterally spaced mounting plates each of which rotatably support three sprocket like gears along their inner faces which receive and maintain said rods in spaced relation.

7. Apparatus for producing corrugated sheet from a web of deformable material as recited in claim 6 wherein said mounting plates are positioned on opposite lateral sides of said continuous loop belt and one of said plates is positioned forwardly of the other along the longitudinal axis of said continuous loop belt to provide a diagonal relation.

8. Apparatus for producing corrugated sheet from a web of deformable material as rectied in claim 6 further comprising means to raise and lower said mounting plates and thus vary the depth of the corrugations in the deformable sheet material.

9. Apparatus for producing corrugated sheet from a web of deformable material as recited in claim 6 wherein said means to force the deformable material down into the grooves of said belt further comprises means on the inner faces of said mounting plates defining said closed loop path means around which the ends of said rods are floatingly carried.

10. Apparatus for producing corrugated sheet from a web of deformable material as recited in claim 9 wherein said means on the inner faces of said mounting plates defining said closed loop path, means comprise a retaining member that passes around a major portion of said path and a vertically oriented plate having a cam surface along its top and bottom surface with these cam surfaces forming an inner rod engaging surface on said closed loop path.

* * * * *